US012764794B2

(12) United States Patent
Yin et al.

(10) Patent No.: US 12,764,794 B2
(45) Date of Patent: Oct. 13, 2026

(54) DOWNLINK COVERAGE WITH BEAM GROUPS FOR NON-TERRESTRIAL NETWORK COMMUNICATIONS

(71) Applicant: Sharp Kabushiki Kaisha, Sakai City (JP)

(72) Inventors: Zhanping Yin, Vancouver, WA (US); Tomoki Yoshimura, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 316 days.

(21) Appl. No.: 18/405,782

(22) Filed: Jan. 5, 2024

(65) Prior Publication Data

US 2025/0227762 A1 Jul. 10, 2025

(51) Int. Cl.

| | |
|---|---|
| ***H04W 74/0833*** | (2024.01) |
| ***H04W 48/08*** | (2009.01) |
| ***H04W 74/00*** | (2009.01) |

(52) U.S. Cl.

CPC ....... *H04W 74/0833* (2013.01); *H04W 48/08* (2013.01); *H04W 74/006* (2013.01)

(58) Field of Classification Search

CPC ............. H04W 74/0833; H04W 48/08; H04W 74/006; H04W 4/16; H04W 56/0085; H04W 48/16; H04B 7/18532

See application file for complete search history.

(56) References Cited

U.S. PATENT DOCUMENTS

| | | | | |
|---|---|---|---|---|
| 2016/0302080 | A1* | 10/2016 | Hwang | H04B 7/0413 |
| 2017/0373890 | A1* | 12/2017 | Fertonani | H04B 1/1661 |
| 2022/0060974 | A1* | 2/2022 | Zeng | H04W 48/16 |
| 2022/0248246 | A1* | 8/2022 | Berliner | H04B 7/0617 |
| 2022/0264589 | A1* | 8/2022 | Sun | H04W 4/70 |
| 2022/0377683 | A1* | 11/2022 | Myung | H04L 5/0005 |

(Continued)

FOREIGN PATENT DOCUMENTS

| | | | | |
|---|---|---|---|---|
| CN | 111294183 B | * | 9/2022 | H04L 5/0048 |
| TW | I713345 B | * | 12/2020 | H04W 74/006 |

(Continued)

OTHER PUBLICATIONS

3GPP TR 38.821 V16.2.0, Solutions for NR to support non-terrestrial networks (NTN) (Release 16), Mar. 2023.

(Continued)

*Primary Examiner* — Ayaz R Sheikh
*Assistant Examiner* — Louis Samara
(74) *Attorney, Agent, or Firm* — Austin Rapp

(57) ABSTRACT

A user equipment (UE) is described. The UE includes receiving circuitry configured to monitor SSBs/PBCHs (synchronization signal blocks/physical broadcast channels) and obtain system information block type 1 (SIB1) information including PRACH configurations. The receiving circuitry may also be configured to evaluate a reference signal received power (RRSP) of synchronization signal blocks (SSBs) for an optimal downlink (DL) beam to determine an uplink (UL) beam, a preamble format/sequence and a physical random access channel (PRACH) resource for a preamble transmission. The receiving circuitry may also be configured to monitor DL signals for a random access response (RAR) within a RAR window. The UE also includes transmitting circuitry configured to transmit the determined preamble in the determined PRACH resource using the determined UL beam.

3 Claims, 14 Drawing Sheets

(56) References Cited

U.S. PATENT DOCUMENTS

2023/0413335 A1* 12/2023 Xiong ........................ H04L 1/08
2024/0049297 A1* 2/2024 Khoshkholgh Dashtaki ............... H04B 7/18513
2024/0049307 A1* 2/2024 Lin .................... H04B 7/18532

FOREIGN PATENT DOCUMENTS

WO WO-2021064706 A1 * 4/2021 .......... H04W 74/006
WO WO-2024067872 A1 * 4/2024 .......... H04W 56/001

OTHER PUBLICATIONS

Huawei (Moderator, RAN1 Vice-Chair), "New WID: Non-Terrestrial Networks (NTN) for NR Phase 3", 3GPP TSG RAN Meeting #102, RP-234078, Dec. 15, 2023.

* cited by examiner

DOWNLINK COVERAGE WITH BEAM GROUPS FOR NON-TERRESTRIAL NETWORK COMMUNICATIONS

TECHNICAL FIELD

The present disclosure relates generally to communication systems. More specifically, the present disclosure relates to downlink coverage with beam groups for non-terrestrial network communications.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
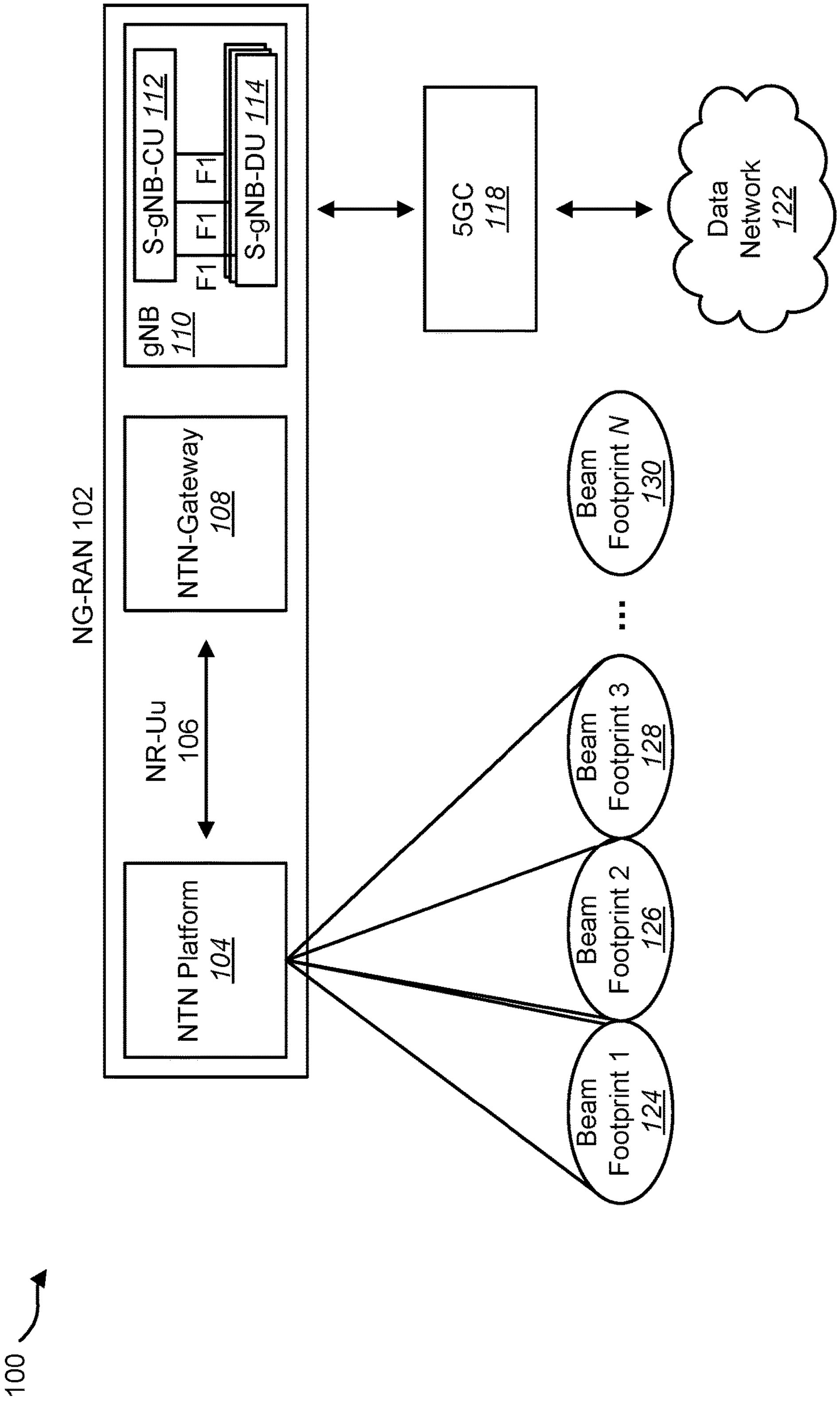
FIG. 1 is a diagram illustrating an example of a non-terrestrial network (NTN) coverage area.

A user equipment (UE) is described. The UE includes receiving circuitry configured to monitor SSBs/PBCHs (synchronization signal blocks/physical broadcast channels) and obtain system information block type 1 (SIB1) information including PRACH configurations. The receiving circuitry may also be configured to evaluate a reference signal received power (RSRP) of synchronization signal blocks (SSBs) for an optimal downlink (DL) beam to determine an uplink (UL) beam, a preamble format/sequence and a physical random access channel (PRACH) resource for a preamble transmission. The receiving circuitry may also be configured to monitor DL signals for a random access response (RAR) within a RAR window. The UE also includes transmitting circuitry configured to transmit the determined preamble in the determined PRACH resource using the determined UL beam.

The PRACH configurations may include multiple RAR parameters with different redundancy levels. The multiple RAR parameters may be mapped to different PRACH resources and preambles.

The receiving circuitry may also be configured to select a PRACH resource and preamble for a RAR parameter based on reliability when a corresponding RAR is not received in the RAR window and maximum preamble power ramping is reached.

The transmitting circuitry may also be configured to transmit the determined preamble in the determined PRACH resource using the determined UL beam when a corresponding RAR is not received in the RAR window and maximum preamble power ramping is reached.

The preamble format may include timing information, location information, sequence information, or cyclic shift information.

A base station (gNB) is described. The gNB includes receiving circuitry configured to receive a preamble in a physical random access channel (PRACH) resource associated with a random access response (RAR) parameter. The receiving circuitry may also be configured to determine a synchronization signal block (SSB) index associated with the preamble to identify a corresponding beam group or beam pattern. The receiving circuitry may also be configured to determine a downlink (DL) beam or a small set of DL beams for the received preamble and corresponding DL beams. The gNB also includes transmitting circuitry configured to transmit SSBs/PBCHs (synchronization signal blocks/physical broadcast channels) with system information block type 1 (SIB1) information. The transmitting circuitry may also be configured to transmit a RAR within a RAR window of a preamble transmission with the determined DL beam or the small set of DL beams.

The transmitting circuitry may also be configured to configure SSBs with different beam groups and/or beam patterns and PRACH resources with different RAR transmission parameters.

In another example, the transmitting circuitry may be configured to transmit the RAR with indicated RAR parameters.

A method by a user equipment (UE) is described. The method includes monitoring synchronization signal blocks/physical broadcast channels (SSBs/PBCHs). The method also includes evaluating a reference signal received power (RSRP) of synchronization signal blocks (SSBs) for an optimal downlink (DL) beam to determine an uplink (UL) beam, a preamble format/sequence and a physical random access channel (PRACH) resource for a preamble transmission. The method also includes transmitting the determined preamble in the determined PRACH resource using the determined UL beam. The method also includes monitoring DL signals for a random access response (RAR) within a RAR window. When a corresponding RAR is not received in the RAR window and maximum preamble power ramping is reached, the method may select a PRACH resource and preamble for a RAR parameter, wherein the selection is based on reliability, or the method may transmit the determined preamble in the determined PRACH resource using the determined UL beam.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a wireless terminal, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a wireless terminal. However, as the scope of the present disclosure should not be limited to the 3GPP standards, the terms "wireless terminal" and "wireless communication device" may be used interchangeably herein to mean the more general term "wireless communication device." A wireless terminal may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a wireless terminal. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the wireless terminal is aware and is allowed by an eNB to transmit or receive information. "Configured cell(s)" may be serving cell(s). The wireless terminal may receive system information and perform the required measurements on all configured cells. "Configured cell(s)" for a radio connection may include a primary cell and/or no, one, or more secondary cell(s). "Activated cells" are those configured cells on which the wireless terminal is transmitting and receiving. That is, activated cells are those cells for which the wireless terminal monitors the physical downlink control channel (PDCCH) and in the case of a downlink transmission, those cells for which the wireless terminal decodes a physical downlink shared channel (PDSCH). "Deactivated cells" are those configured cells that the wireless terminal is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. To meet a latency target and high reliability, mini-slot-based repetitions with flexible transmission occasions may be supported. Approaches for applying mini-slot-based repetitions are described herein. A new radio (NR) base station may be referred to as a gNB. A gNB may also be more generally referred to as a base station device.

One important objective of 5G is to enable connected industries. 5G connectivity can serve as a catalyst for the next wave of industrial transformation and digitalization, which improve flexibility, enhance productivity and efficiency, reduce maintenance cost, and improve operational safety. Devices in such environments may include, for example, pressure sensors, humidity sensors, thermometers, motion sensors, accelerometers, actuators, etc. It is desirable to connect these sensors and actuators to 5G networks and core. The massive industrial wireless sensor network (IWSN) use cases and requirements include not only URLLC services with very high requirements, but also relatively low-end services with the requirement of small device form factors, and/or being completely wireless with a battery life of several years. The requirements for these services that are higher than low power wide area (LPWA) (e.g., LTE-MTC and/or Narrowband Internet of Things (LTE-M/NB-IoT)) but lower than URLLC and eMBB.

A non-terrestrial network (NTN) refers to a network, or segment of networks using radio frequency (RF) resources onboard a satellite (or UAS platform). Non-Terrestrial Network typically features the following elements: one or several sat-gateways that connect the Non-Terrestrial Network to a public data network. For example, a Geostationary Earth Orbiting (GEO) satellite is fed by one or several sat-gateways which are deployed across the satellite targeted coverage (e.g., regional or even continental coverage). It may be assumed that wireless terminals in a cell are served by only one sat-gateway. A Non-GEO satellite served successively by one or several sat-gateways at a time. The system ensures service and feeder link continuity between the successive serving sat-gateways with sufficient time duration to proceed with mobility anchoring and hand-over.

Additionally, Non-Terrestrial Network typically features the following elements: a Feeder link or radio link between a sat-gateway and the satellite (or Unmanned Aircraft System (UAS) platform), a service link or radio link between the wireless terminal and the satellite (or UAS platform).

Additionally, Non-Terrestrial Network typically features the following elements: a satellite (or UAS platform) which may implement either a transparent or a regenerative (with onboard processing) payload. The satellite (or Unmanned Aircraft System (UAS) platform) may generate several beams over a given service area bounded by its field of view. The footprints of the beams are typically of elliptic shape. The field of view of a satellite (or UAS platform) depends on the onboard antenna diagram and min elevation angle. For a transparent payload, radio frequency filtering, frequency conversion and amplification may be applied. Hence, the waveform signal repeated by the payload is un-changed. For a regenerative payload, radio frequency filtering, frequency conversion and amplification as well as demodulation/decoding, switch and/or routing, coding/modulation may be applied. This is effectively equivalent to having all or part of base station functions (e.g., gNB) onboard the satellite (or UAS platform).

Additionally, Non-Terrestrial Network may optionally feature the following elements: Inter-satellite links (ISL) optionally in case of a constellation of satellites. This will require regenerative payloads onboard the satellites. ISL may operate in RF frequency or optical bands.

Additionally, Non-Terrestrial Network typically features the following elements: User Equipment may be served by the satellite (or UAS platform) within the targeted service area.

There may be different types of satellites (or UAS platforms): Low-Earth Orbit (LEO) satellite, Medium-Earth Orbit (MEO) satellite, Geostationary Earth Orbit (GEO) satellite, UAS platform (including High-Altitude Platform Station (HAPS) and High Elliptical Orbit (HEO) satellite). Detailed descriptions are shown in Table 1.

TABLE 1

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Typically, GEO satellites and UAS are used to provide continental, regional or local service. A constellation of LEO and MEO may be used to provide services in both Northern and Southern hemispheres. In some cases, the constellation can even provide global coverage including polar regions. For the later, this requires appropriate orbit inclination, sufficient beams generated and inter-satellite links.

Non-terrestrial networks may provide access to wireless terminal in six reference scenarios including: Circular orbiting and notional station keeping platforms, highest round trip delay (RTD) constraint, highest Doppler constraint, a transparent and a regenerative payload, one ISL case and one without ISL (Regenerative payload is mandatory in the case of inter-satellite links), fixed or steerable beams resulting respectively in moving or fixed beam foot print on the ground.

In typical Terrestrial Networks (TN) and previous studies, the uplink (UL) channels are normally the bottleneck that requires coverage enhancement, e.g. with repetitions.

Non-Terrestrial Networks (NTN) have good potential for ubiquitous coverage for 5G/6G networks. There are some fundamental restrictions for NTN communications including a large footprint of the satellite coverage and limited transmission power at the satellite. Thus, there is a need for DL coverage enhancement, so that an NTN satellite may limit the number of simultaneous transmitted beams to a reasonable threshold to provide desirable DL channel quality.

In the embodiments herein, an analysis is provided of the potential number of beams in a NTN coverage area, and the need to use beam group and/or beam pattern for NTN DL coverage enhancements. Several enhancement methods are also provided for the DL coverage during the physical random access channel (PRACH) procedure, especially the beam determination for random access response (RAR) transmission in a PRACH procedure.

The gNB may configure beam groups and/or beam patterns for simultaneous beam transmissions. An SSB/PBCH transmission may be associated with a beam group and/or a beam pattern. The PRACH resources (time location/preamble sequence/cyclic shift, etc.) may be configured to map to the SSB indexes.

The UE may detect the SSB index and determine the UL beam and the PRACH resource for the PRACH preamble transmission.

The gNB may determine the beam group and/or beam pattern for the received preamble and evaluate which beam or beam(s) are likely used for the preamble. Then the gNB may determine the DL beam or a smaller set of DL beams within the determined beam group and/or beam pattern for the RAR transmission. Thus, more energy can be allocated to the RAR transmission to enhance the DL coverage.

The gNB may configure multiple RAR parameters with different redundancy levels, and may link RAR parameters to different PRACH resources and preambles.

In extreme cases, the UE cannot detect RAR due to bad DL channel conditions even if power ramping is applied to the preamble transmissions. The UE can select from the configured PRACH resource and preamble to indicate a RAR configuration with more redundancy to enhance the DL coverage.

NTN DL Coverage Problems

In Release 17, a work item was carried out to define solutions enabling New Radio (NR) and NG-RAN to support Non-Terrestrial Networks (NTN). Then, Release 18 introduced enhancements for NR NTN. As part of Release 19, a new work item is proposed to define further enhancements for NG-RAN based Non-Terrestrial Networks in order to offer optimized performance especially when addressing handset terminals with respect to downlink coverage considering the NTN deployment constraints such as payload power limitation, large satellite footprint and limited feeder link bandwidth.

DL coverage enhancements are needed to accommodate satellite payload constraints which may be unable to have all its beams active with the nominal Effective Isotropic Radiated Power (EIRP) density per beam at a given time due to limited power and limited feeder link bandwidth, while maximizing the number of beams that can be activated simultaneously, and ensuring that all user terminals can be served across the satellite foot print while maximizing the overall satellite throughput and ensuring that all satellite's radio cells are kept alive even without traffic but allowing new users to join or preventing impact on end-user QoS.

FIG. 1 is a diagram 100 illustrating an example 100 of a non-terrestrial network (NTN) coverage area with a plurality of beams. The Next Generation Radio Access Network (NG-RAN) 102 includes an NTN-Platform 104 in communication with an NTN-Gateway 108 through a 5G air interface, such an NR-Uu 106 (New Radio User Equipment (UE) to the NR Node B (gNB) radio interface). The NG-RAN 102 also includes a base station device (gNB) 110. The gNB 110 includes an S-gNB-CU (Secondary gNodeB Control Unit) 112 and an S-gNB-DU (Secondary gNodeB Distributed Unit) 114 in communication with each unit via F1 interfaces.

The NTN coverage area includes a plurality of beams having footprints: beam footprints 1, 2, 3, . . . . N (124, 126, 128, 130). The 5G Core network (5GC) 118 is in communication with the NG-RAN 102 and a data network 122, such as a global communications network or other data network.

Hence DL coverage enhancements are needed:

- to maximize the number of beams that can be activated simultaneously through EIRP reduction compared to the nominal EIRP density per beam.
- to ensure that all user terminals can be served across the satellite footprint through dynamic power sharing between beams or different beam pattern/sizes (i.e., wide or narrow) to ensure that all the satellite footprints can be served with efficient use of the satellite resources (e.g., power, frequency, and time) while maximizing the overall throughput.

DL coverage enhancements should be considered at both:

- Link level to improve the link margin of selected physical channels in order to accommodate the EIRP reduction in FR1-NTN. A link margin improvement for physical channels (e.g. PDSCH and PDCCH) may be considered without impact on SSB design.
- System level to support an efficient dynamic and flexible power sharing between beams or different beam patterns/sizes (i.e., wide or narrow) across the satellite footprint for FR1-NTN and FR2-NTN.

For the deployment perspectives, all satellites for 5G satellite networks (operating in FR1 as well in FR2, and covering both GEO and NGSO constellations) to be deployed in the next 10 years are expected to be designed under the assumptions of optimized power, and hence there is a strong need to implement DL coverage enhancement techniques to optimize CAPEX and OPEX for a given targeted coverage.

Further enhancements may be specified for NG-RAN 102 based NTN (Non-Terrestrial Networks) with the following assumptions:

- GSO (Geo Synchronous Orbit) and NGSO (Non-Geo Synchronous Orbit). NGSO includes Low Earth Orbit (LEO) and Medium Earth Orbit (MEO).
- Earth fixed tracking area. Earth fixed & Earth moving cells for NGSO.
- Frequency Division Duplexing (FDD) mode.
- UEs with GNSS (Global Navigation Satellite Systems) capabilities.
- In a frequency band above 10 GHz, both Terminal Type 1 (Electronic steering antenna) and Type 2 (Mechanical steering antenna) can be considered for GSO and NGSO.
- Implicit compatibility to support HAPS (High Altitude Platform Station) and ATG (Air To Ground) scenarios, where relevant.

A "VSAT" device with external antenna on a moving platform is equivalent to a device that operates on platforms in motion, and this is referred to as ESIM (Earth Station In Motion).

An objective is to study and specify if beneficial downlink coverage enhancements targeting support for additional reference satellite payload parameters covering both GSO and NGSO constellations are operating in FR1-NTN or FR2-NTN.

- Define additional reference satellite payload parameters assuming power sharing among satellite beams or different satellite beam patterns/sizes (i.e. wide or narrow) across the satellite footprint, such that satellite beams may not all be simultaneously active or may be active below the nominal EIRP density per satellite beam due to limited power and limited feeder link bandwidth.
- Define the corresponding power sharing assumptions and necessary link level and system level evaluation methodology and relevant Key Performance Indicators (KPIs) for evaluations of the coverage, to allow for identification of physical channels/signals and system-level aspects that need enhancements and the corresponding needed improvements.
- Study link level enhancements for FR1-NTN (e.g. for PDCCH, PDSCH) and/or system level enhancements for FR1-NTN and/or FR2-NTN, allowing dynamic and flexible power sharing between satellite beams or different satellite beam patterns/sizes (i.e. wide or narrow) across the satellite footprint.
- Considerations for this objective:
  - SSB channel enhancement may not be considered.
  - Antenna gain of UE shall be assumed to be −5.5 dBi in case of smartphone in FR1-NTN, the UE is assumed to be a full duplex UE, and at least 2Rx are considered at the UE.
  - NGSO to be considered in priority: LEO Set-1 @ 600 km.
  - Release 18 network energy saving techniques should be considered as baseline in the system level study.

The link level may include possible techniques such as increased repetition scheme or equivalent techniques depending on the physical channel. The system level performance may be achieved by leveraging network energy saving techniques. For example, a total number of beams=1200 may be assumed for NGSO operating in FR1 band. This would correspond to the number of beams necessary to serve a satellite footprint at 30° min elevation with ~50 km diameter beam size.

As an example, consider in priority the TR 38.821 LEO set 1 @600 km scenario in FR1 (i.e., S-band). In the following, the rationale is presented for the identification of the aggregated EIRP in a satellite.

- From TR 38.821 LEO S-band set1 @600 km, the nominal EIRP density per beam is 34 dBW/MHz, corresponding to a nominal EIRP 41 dBW per beam with 5 MHz allocated bandwidth.
- Given this satellite altitude, the entire satellite footprint diameter is about 1500 km, assuming the target minimum elevation of 30°. In a first approximation, to cover this footprint area with regular beam size (about 50 km diameter from TR 38.821), the total number of satellite beams (124-130) to be generated is approximately 1200.
- In order to generate all these beams, the hypothetical aggregate EIRP should be: 41 dBW+10 log 10 (1200) =72 dBW. This RF power is very high and demanding in terms of on board complexity. In addition, this is leading to 1200×5 MHz=6 GHz of required feeder link spectrum, which is another strong challenge in terms of onboard processing bandwidth.
- Reasonably, E=56 dBW of satellite aggregated power should be considered, leading to a maximum number of N=30 beams to be assumed with the nominal EIRP density.
  EdBW=41 dBW+10 log 10(N=30)=56 dBW
- This leads to X=16 dB gap between the hypothetical and the reasonable aggregated EIRP.
- This X=16 dB loss can be compensated by:
- Partly X1 dB with a link margin improvement at link level to generate simultaneous more beams and hence increase the instantaneous satellite coverage.
  - Given that the SSB channel (that should not be impacted) features approximately a 9 dB link margin, it is acceptable to reduce this link margin to the minimum (i.e. 3 dB for system loss) hence requiring to improve the link margin of other physical channels to X1=6 dB.
  - With 6 dB link margin improvement, 120 beams could be generated simultaneously. With 120 corresponding to N=30×10^(X1=6/10).
- Partly X2 dB with an active/total beam ratio of thanks to enhanced dynamic and flexible power sharing between beams. Here is the ratio=1/10.

PRACH Procedures

To connect to NTN systems, an NTN UE needs to perform contention based random access (CBRA) first. Both 4-step RACH procedure and 2-step RACH procedure can be used for the random access.

Figure 2:
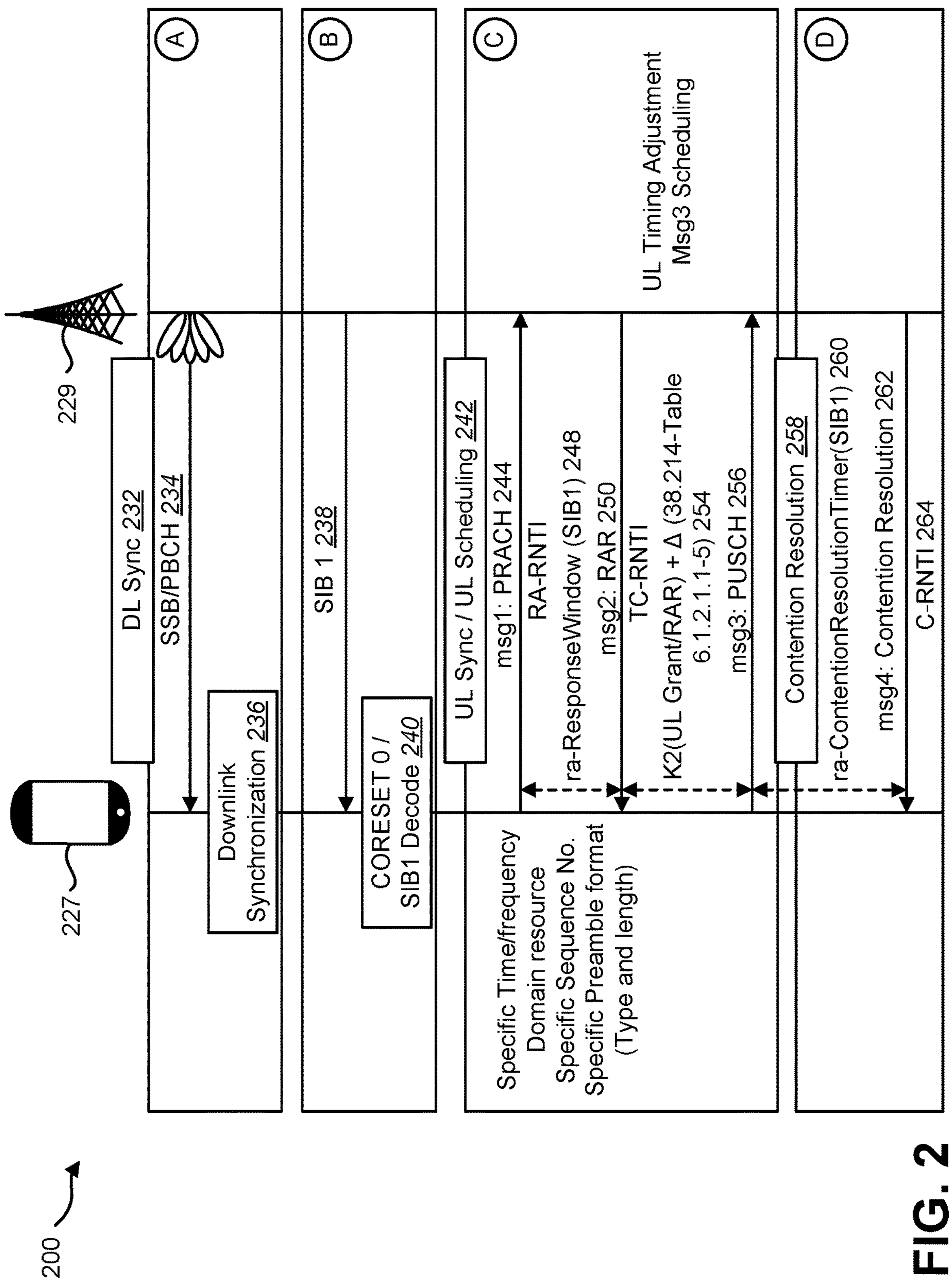
FIG. 2 is a diagram illustrating an example of a random access channel (RACH) procedure.

FIG. 2 is a diagram 200 illustrating an example of a four-step random access channel (RACH) procedure.

In parts A and B, the UE 227 receives SSB/PBCH 234 and SIB1 238 from the gNB 229 broadcast messages to get the information on PRACH resources and preamble configurations. Downlink synchronization 236 may occur after message 234. A Coreset 0/SIB 1 Decide 240 may occur after message 238.

Part C shows UL Sync/UL Scheduling 242 and Part D shows Contention Resolution 258.

In the RACH Procedure:

Step 1: Msg1 244 (Preamble Transmission): The UE 227 selects a random access preamble from a set of predefined preambles. These preambles can be of roughly two categories: Short Preamble and Long Preamble Format. The UE 227 also selects a random sequence number for the preamble. After choosing the preamble and sequence number, the UE 227 transmits the preamble on the PRACH. Msg1 244 and Msg2 250 may be separated by a response window ra-ResponseWindow (SIB1) 248.

Step 2: Msg2 250 (Random Access Response): Upon receiving Msg1, the gNB 229 sends a response called Msg2 250. Msg2 250 includes several critical pieces of information, such as the Time Advance (TA) command for timing adjustment, the RAPID (Random Access Preamble ID) matching the preamble sent by the UE, and an initial uplink grant for the UE. The gNB 229 also assigns a temporary identifier called RA-RNTI (Random Access Radio Network Temporary Identifier) to the UE. Msg2 250 and Msg3 256 may be separated by K2 (UL Grant/RAR)+Δ (from 38.214, Table 6.1.2.1.1-5) 254.

Step 3: Msg3: 256 Using the initial uplink grant provided in Msg2 250, the UE 227 transmits Msg3 256 on the PUSCH (Physical Uplink Shared Channel). Msg3 256 is a PUSCH which may carry a certain RRC message (e.g, RrcRequest) or just be pure PHY data.

Step 4: Msg4 262 (Contention Resolution): After processing Msg3 256, the gNB 229 sends Msg4 262 to the UE 227. Msg4 262 is a MAC data which is for Contention Resolution. The Contention Resolution message contains the UE's identity, confirming that the gNB 229 has correctly identified the UE 227, and contention has been resolved. At this step, the network 122 provides UE 227 with C-RNTI (Cell Radio Network Temporary Identifier) 264. Msg3 256 and Msg4 262 may be separated by a window ra-ContentionResolutionTimer (SIB1) 260.

Figure 3:
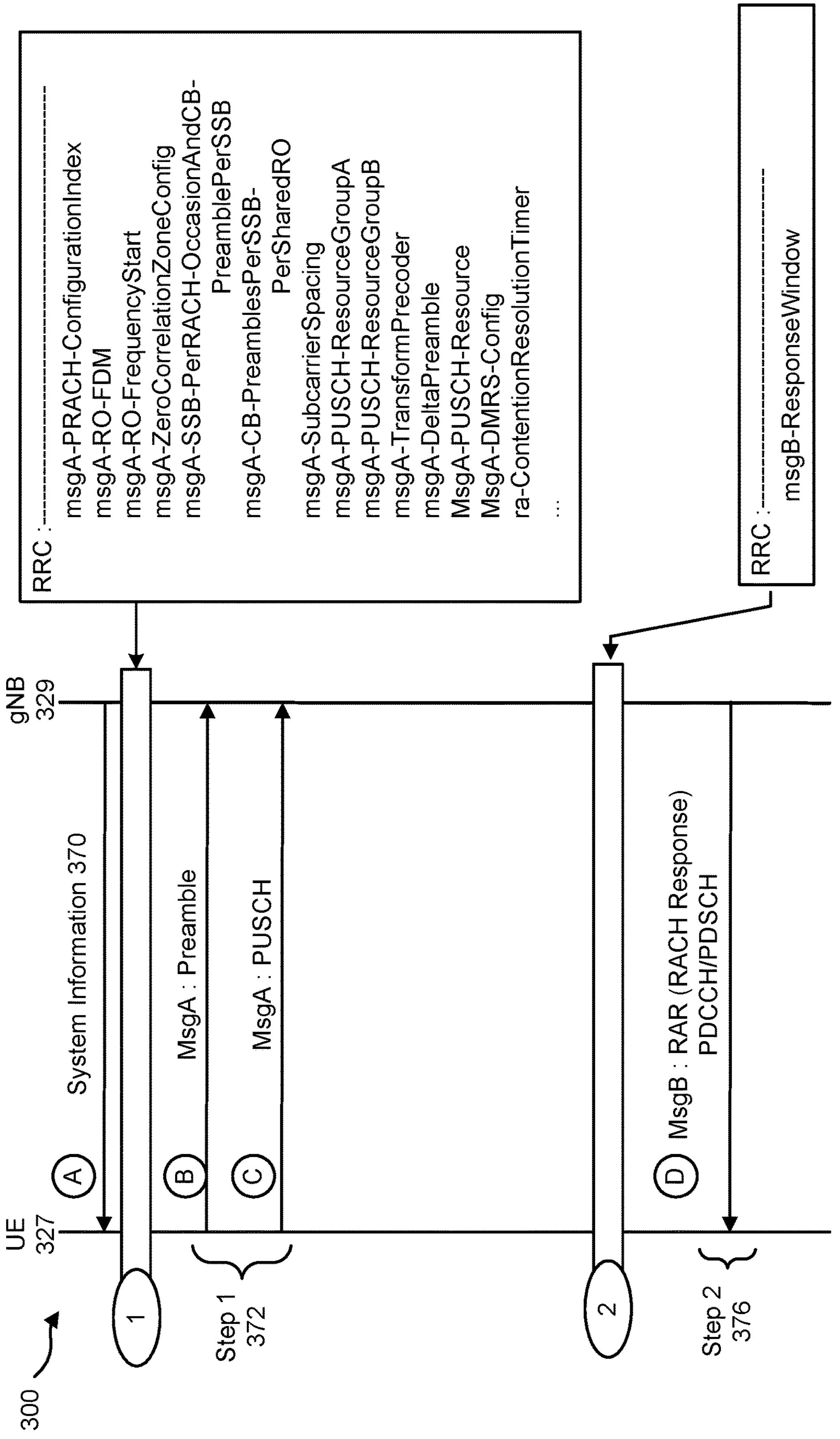
FIG. 3 is a diagram illustrating another example of a random access channel (RACH) procedure.

FIG. 3 is a diagram 300 illustrating an example of a two-step random access channel (RACH) procedure. Similarly in 2-step RACH, PUSCH can be transmitted at the very first step whereas a PUSCH can be transmitted at step 3 in regular RACH. Comparing the 2 Step RACH (FIG. 3) with the 4 Step RACH (FIG. 2), Step 1 372 (MsgA) is the combination of step 1 and step 3 from FIG. 2, and step 2 376 (MsgB) is the combination of step 2 and step 4 from FIG. 2.

The UEs 327 first listen to the Synchronization Signal (SS) Blocks from the gNB 329 and select an SS-Block (SSB) before selecting RA preamble. If available, the UE 327 selects an SS Block for which the RSRP is reported above rsrp-ThresholdSSB for PRACH transmission, otherwise, UE 327 selects any SSB. The UE 327 always scans the radio signals and their measurements. So the UE 327 processes the beam measurements and detects the best beam during synchronization. Consecutively, the UE 327 decodes the 5G NR system information 370 (MIB/SIB) on that beam. Minimum SI (System Information 370) is carried onto the PBCH channel.

The UE 327 finds the good beam during the synchronization process and uses this beam and attempts random access procedure by transmitting RACH preamble (Msg-1 244) on the configured RACH resource. The preamble is referenced with the Random Access Preamble Id (RAPID). The preamble transmission is a Zadoff-Chu sequence. The UE 327 then selects an RA Preamble randomly with equal probability from the RA Preambles associated with the selected SSB and the selected RA Preambles group.

DL Coverage Enhancement with Beam Determination and Reduction for RAR Transmission For DL, the SSBs/PBCHs are assumed to be sufficient for coverage, thus no enhancement is required. With beam management, PDCCH and PDSCH coverages can be achieved by using a finer beam to the UE, reducing the number of simultaneous transmitted beams, and applying repetitions if necessary.

However, a RACH procedure is performed before the NTN UE is connected to the network. Finer beam management and UE specific configurations are not available yet. For a 4-step RACH procedure, an NTN UE needs to receive Msg 2 and Msg 4 to establish the RRC connection. In 2-step RACH, the UE 327 needs to receive MsgB. If the DL channel is very bad, the Msg2/Msg4 or MsgB may not be correctly decoded at the NTN UE. In the context below, the random access response (RAR) may be used for Msg 2 in 4-step RACH procedure or MsgB in 2-step RACH procedure.

Furthermore, since there are potentially thousands of cells/beams under an NTN coverage, if the NTN gNB cannot determine which beam or beams should be used for the Msg2 or Msg B transmission:

- There is not enough power to broadcast the random access response (RAR) on all beams. If so, the received power at UE 327 will be too weak.
- There may not be enough time in the RAR reception window to transmit RAR to all beam groups in a TDM manner.
- Also, it is a waste of resources if the (RAR) is transmitted to other cells with different beams, the UE 327 cannot detect it anyway.

Therefore, some mechanisms should be introduced to enhance the beam determination for the RAR transmission from the NTN satellite.

To establish a suitable beam pair during the initial access phase, receiver side analog beam sweeping for the preamble reception is the key, especially for NTN with thousands of beams. As described above, the UE measures the SSBs to determine the best beam for preamble transmission. Each SSB has a unique SSB index. By connecting an SSB index with a specific RACH resource (slot and/or preamble), the UE will use that when accessing the cell. The base station (gNB) then knows which beam the UE prefers.

Beam establishment during initial access is enabled by the possibility of associating different SSB time indices with different RACH time/frequency occasions and/or different preamble sequences. Since different SSB time indices correspond to SSB transmissions in different DL beams, the gNB can determine the DL beam in which the corresponding UE is located based on the received preamble. This beam can then be used as an initial beam for subsequent DL transmissions to the UE.

Furthermore, if the association between SSB time index and RACH occasion is such that a given time-domain RACH occasion corresponds to one specific SSB time index, the network will know when, in time, preamble transmission from UEs within a specific DL beam will take place. Assuming beam correspondence, the network can then focus the UL receiver beam in the corresponding direction for beam-formed preamble reception. This implies that the receiver beam will be swept over the coverage area synchronized with the corresponding DL beam sweep for the SS-block transmission. Note that beam sweeping for preamble transmission is only relevant when analog beamforming is applied at the receiver side. If digital beamforming is applied, beam-formed preamble reception can be done from multiple directions simultaneously.

The above procedure is sufficient for regular terrestrial network (TN) since only one beam is associated with a SSB index.

In NTN, from the UE's perspective, each SSB index is only one beam. The UE can determine the Msg 1 preamble transmission with corresponding UL beam based on the DL beam of the best detected SSB index. So, the procedure to determine the preamble beam and PRACH resource can be the same as legacy systems.

NTN UE monitors SSB signals and determines the SSB index with best signal quality that exceeds the rsrp-ThresholdSSB if configured. The NTN UE determines the DL beam for the given SSB index, and applies the suitable UL beam based on beam correspondence. The NTN UE then transmits the Msg 1 using the determined UL beam in a RACH resource with a preamble. The RACH resource and preamble format/sequence may be determined and associated with SSB index as configured/indicated by the gNB. The UE procedure with beam determination and PRACH resource selection is summarized in FIG. 4.

Note that the UE may not understand the concept of beam group and/or beam pattern during the initial access phase. After the RACH procedure is in connected mode, the beam group and/or beam pattern can be further utilized to indicate DL reception instances within the beam group and/or beam pattern. A specific beam for the UE in the beam group/and/or beam pattern may be used, an even finer beam may be applied for a unicast DL transmission to a specific UE. Therefore, it is beneficial that the UE will treat each SSB beam as a beam group and/or beam pattern. The concept may be specified in the standard. The parameters of the beam group and/or beam pattern may or may not be indicated to NTN UEs.

The SSB and RAR are broadcast or groupcast messages in nature. Different from SSB and RAR transmissions, the gNB can determine the specific beam for unicast messages, and optimize the power allocation by scheduling appropriate simultaneous transmissions among target UEs.

Figure 4:
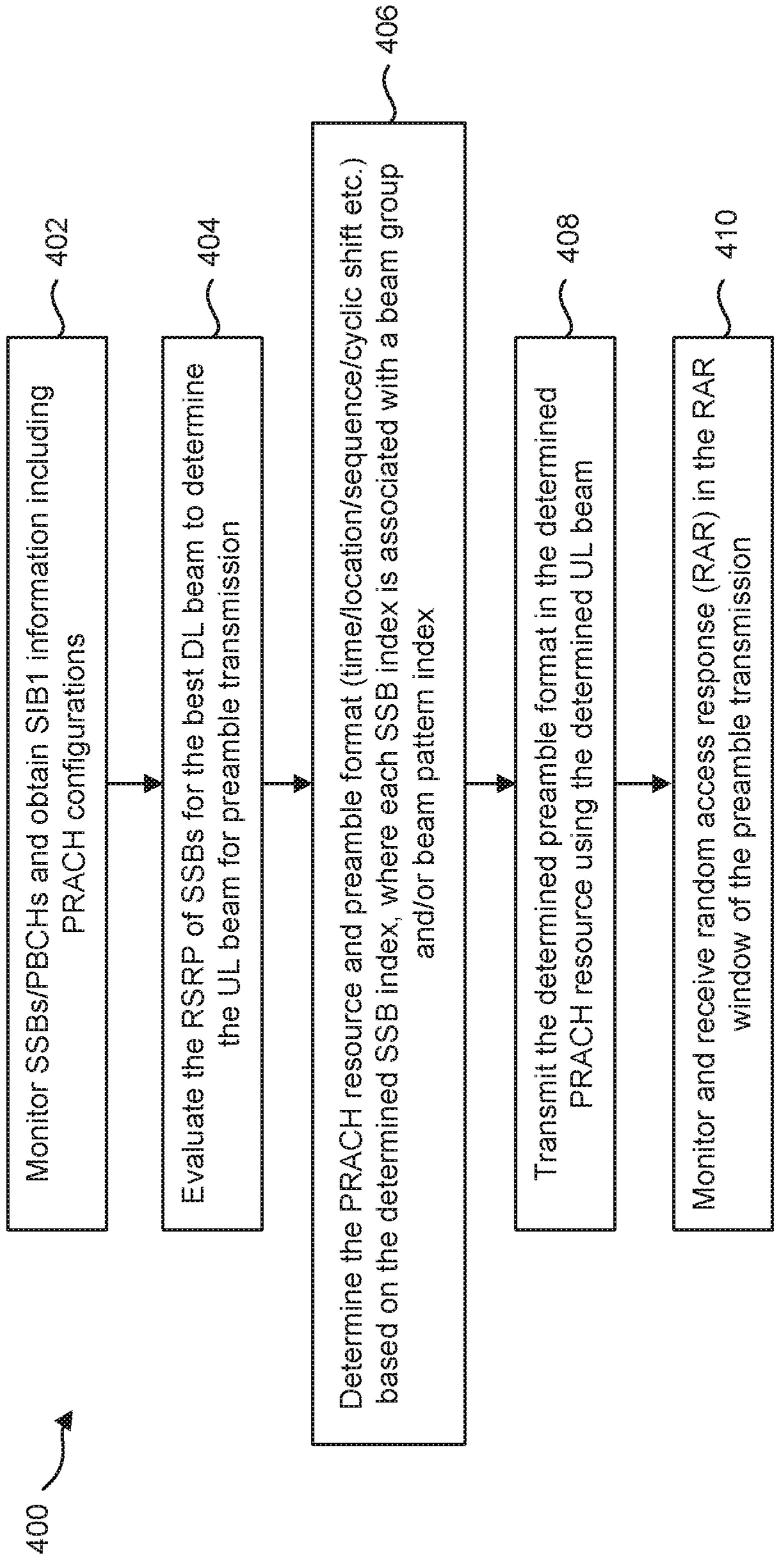
FIG. 4 is a flow diagram illustrating an example of UE behavior.

FIG. 4 is a flow diagram illustrating an example of UE behavior. The UE may monitor 402 SSBs/PBCHs and obtain SIB1 information including PRACH configurations. The UE may evaluate 404 the RSRP of SSBs for the best DL beam to determine the UL beam for preamble transmission. The UE may determine 406 the PRACH resource and preamble format (time/location/sequence/cyclic shift etc.) based on the determined SSB index, where each SSB index is associated with a beam group and/or beam pattern index. The UE may transmit 408 the determined preamble format in the determined PRACH resource using the determined UL beam. The UE may monitor 410 and receive random access response (RAR) in the RAR window of the preamble transmission.

However, for the NTN satellite and gNB, each SSB index can be used to transmit multiple beams, e.g. beams for a beam group and/or beam pattern. Thus, from the NTN gNB point of view, each SSB time index is associated with a beam group and/or beam pattern, i.e. many different beams instead of one specific beam, e.g. a number of N beams in the beam group and/or beam pattern. The number of beams N in a beam group and/or a beam pattern may be configured for the NTN satellite by the gNB. The number of beams N in a beam group and/or a beam pattern may be determined based on the satellite capability and/or the satellite orbit, etc.

Even if the mentioned methods are applied, further enhancements should be used to determine the corresponding DL cell or beam for preamble from the UE. If the gNB cannot reduce the number of the beams within the beam group, the gNB will send RAR to all beams in the beam group, which results in lower power for each beam, or perform in TDD manner to send RAR to multiple subgroups of beams.

Therefore, additional steps can be performed to determine the UL beam of the received preamble from an NTN UE.

The gNB first determines the beam group and/or beam pattern based on the receive preamble format/sequence and RACH resource.

Then, the gNB refines the beams in the beam group and/or beam pattern. This can be achieved by evaluate the received signal quality by applying corresponding UL beams for each DL beam in the beam group and/or beam pattern.

If RACH preamble beam can be determined or set of beams can be reduced, the gNB only needs to send the RAR in the determined beam or the set of beams. Thus, each beam can have more energy with increased DL coverage.

If the beams in the beam group and/or beam pattern have enough separation, the gNB may determine the RACH preamble beam by comparing all reception beams correspondence to the DL beams based on the beam set. If the corresponding DL beam can be determined, the gNB may send RAR with the determined DL beam only with more power.

Figure 5:
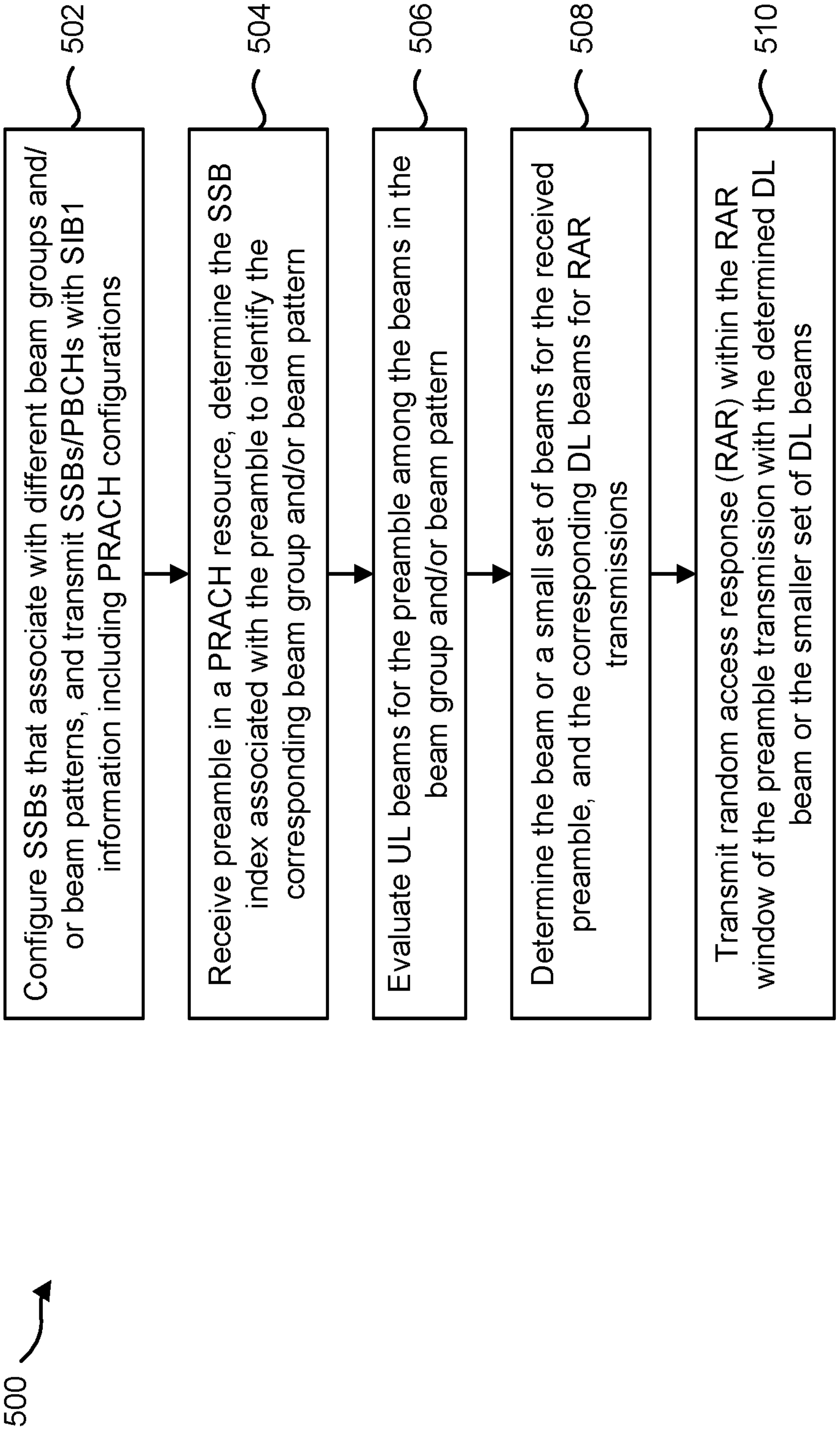
FIG. 5 is a flow diagram illustrating an example of gNB behavior.

FIG. 5 is a flow diagram illustrating gNB behavior with beam determination. The gNB may configure 502 SSBs that associate with different beam groups and/or beam patterns, and transmit SSBs/PBCHs with SIB1 information including PRACH configurations. The gNB may receive 504 a preamble in a PRACH resource, determine the SSB index associated with the preamble to identify the corresponding beam group and/or beam pattern. The gNB may evaluate 506 UL beams for the preamble among the beams in the beam group and/or beam pattern. The gNB may determine 508 the beam or a small set of beams for the received preamble, and the corresponding DL beams for RAR transmissions. The gNB may transmit 510 random access response (RAR) within the RAR window of the preamble transmission with the determined DL beam or the smaller set of DL beams.

Alternatively or additionally, it may be not feasible to determine the exact beam for the preamble. Furthermore, due to channel variations, the derived beam may not be accurate. To improve the likelihood of RAR reception at the NTN UE, the gNB can determine a smaller set of beams, e.g. M beams where M<N, based on M beams with the best RSRP by evaluating the corresponding reception beams based on the associated beam group and/or beam pattern. The gNB can send the RAR only using the set of M beams instead of N beams, thus each beam can be allocated with more power.

The number of beams M for simultaneous RAR transmissions in a beam group and/or a beam pattern may be configured for the NTN satellite by the gNB. The number of beams M for simultaneous RAR transmissions in a beam group and/or a beam pattern may be determined based on the satellite capability and/or the satellite orbit, etc.

The gNB may transmit RAR with beam subsets in a TDD manner with the order of the likelihood of the preamble beam, so that more energy can be allocated to the RAR in each beam transmission. The gNB may transmit RAR with the determined beams in a TDD manner with the order of the determined beams, so that more energy can be allocated to the RAR in each beam transmission.

In a 4-step RACH procedure, the method can be further applied for Msg 4 beam determination at gNB for coverage enhancement. If Msg 2 is received, UE transmits Msg 2 based on the UL grant in Msg 2 using the same UL beam for Msg 1. The gNB can further reduce the number of beams for Msg 4 transmission by comparing with different reception beams. Thus, Msg 4 can be sent with only one beam (or a smaller number of beams m, where m<M if not possible) to further enhance the coverage by boosting the power.

DL Coverage Enhancement with RAR Configuration Selection and Indication from NTN UE In some extreme bad coverage cases, the NTN UE sends the RACH preamble and cannot detect or decode a corresponding RAR from the gNB. Especially, if the above mentioned beam refinement is already applied at the gNB, and the UE still cannot correctly receive RAR, the UE may assume the preamble is not detected, and will perform preamble power ramping procedure, i.e. If no Random Access Response (RAR) is received within a predetermined window, the UE can assume that the preamble was not correctly received by the network, and the reason might be that the preamble was transmitted with too low power.

However, if the DL coverage is the bottleneck, preamble power ramping will not solve the problem, and the NTN UE cannot be connected if RAR (Msg 2 or MsgB) is not received. Therefore, some mechanisms for UE to indicate the gNB for RAR power boosting should be supported for DL coverage enhancements.

To provide more reliable detection of RAR, the gNB can configure more resources with lower MCS (Modulation-and-Coding-Scheme) setting and lower code rate, or implement some type of RAR repetition. Different sets of RAR parameters may be configured to provide different coverage conditions for the RAR.

If the NTN UE failed to decode RAR and is aware of it, it may indicate to gNB to allocate more resource for RAR transmission. To support UE indication of different RAR message configurations, the gNB can configure different PRACH resources to represent different RAR power ramping or code rate settings or RAR repetitions. The configuration information should be broadcast in SIB.

One or more dedicated PRACH resources may be configured for each level of power ramping or code rate or RAR repetitions. The PRACH resources may be PRACH in different time locations, and/or different preamble sequences, and/or different cyclic shifts for a preamble sequence.

In one example, separate PRACH time locations are associated with a SSB index to define different RAR settings. In another example, separate preamble sequences in a PRACH time location are associated with a SSB index to define different settings. Yet in another example, different cyclic shift values for a preamble sequence in a PRACH time location are associated with a SSB index to define different RAR settings.

Alternatively or additionally, dedicated resources may be configured for each level of power ramping or code rate or RAR repetitions without SSB index association. The dedicated resources can be PRACH in different time locations, and/or different preamble sequences, and/or different cyclic shifts for a preamble sequence. This reduces the resource overhead of PRACH resources.

The RAR settings may be defined with a scaling factor of the default RAR transmission configuration, e.g. 2, 4, 8 times of the default resources, power boosting or repetitions of the regular RAR setting.

On the UE side, the NTN UE performs preamble transmission with different PRACH resource/preamble/sequence to indicate the requested RAR configuration. For example, if RAR is not detected after power ramping procedure if preamble transmissions, the NTN UE should select a different preamble transmission to indicate the next level of RAR power ramping until the RAR is detected or if all level of scaling factors are reached. By transmitting a preamble on the dedicated RACH resources corresponding to selected RAR configuration setting, the UE informs the network that more robust format is required for the RAR transmission. The RAR configuration indication can be applied independently or jointly with the beam determination method at the UE and/or gNB.

Figure 6:
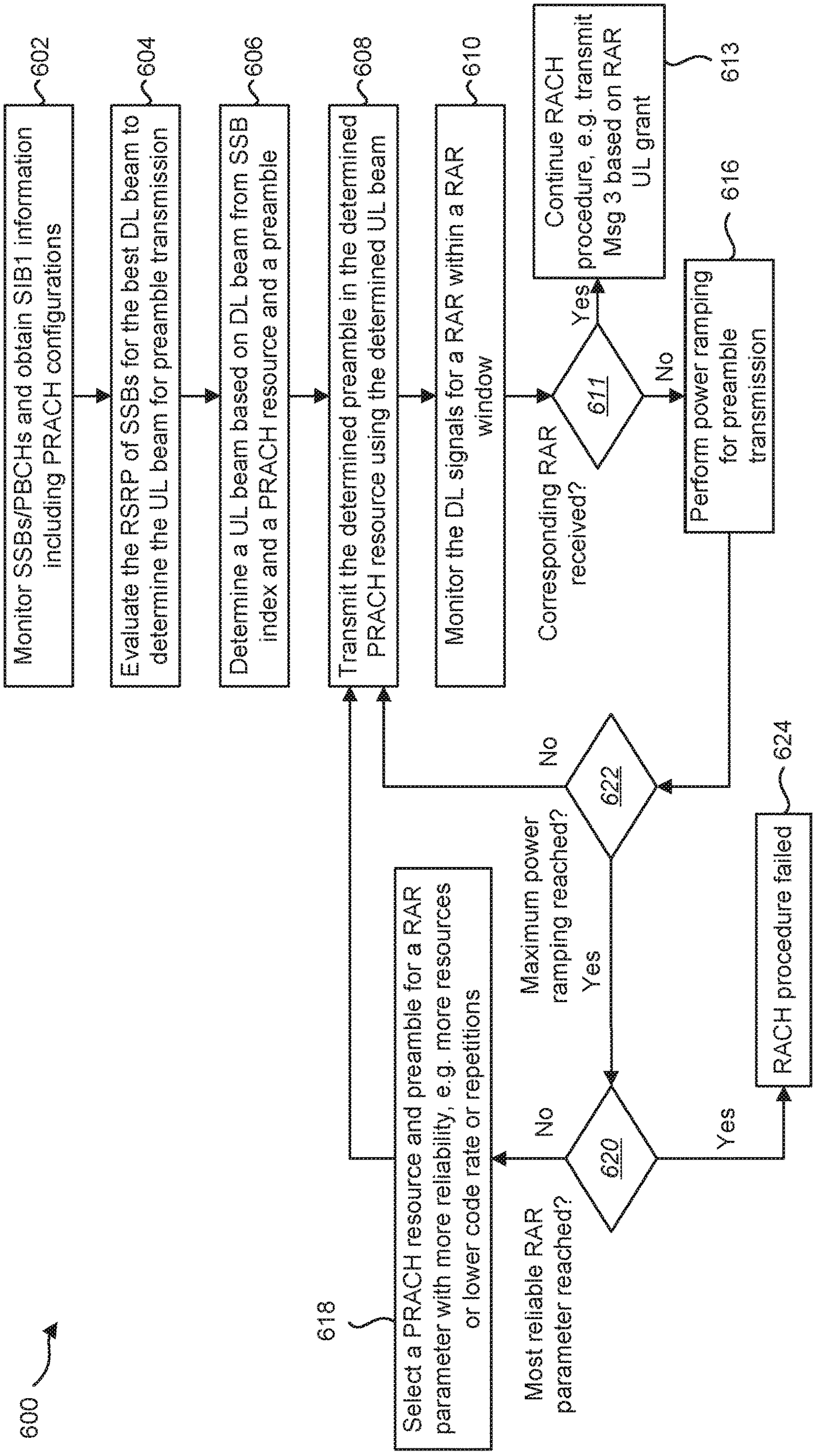
FIG. 6 is a flow diagram illustrating another example of UE behavior.

FIG. 6 is a flow diagram illustrating the UE procedure for RACH configuration and parameter indication. The UE procedure may monitor 602 SSBs/PBCHs and obtain SIB1 information including PRACH configurations. The UE procedure may evaluate 604 the RSRP of SSBs for the best DL beam to determine the UL beam for preamble transmission. The UE procedure may determine 606 a UL beam based on DL beam from SSB index and a PRACH resource and a preamble. The UE procedure may transmit 608 the determined preamble in the determined PRACH resource using the determined UL beam. The UE procedure may monitor 610 the DL signals for a RAR within a RAR window. At 611, if the corresponding RAR is received, the RACH procedure will continue, e.g. transmit 613 Msg 3 based on RAR UL grant. If the RAR is not received, the procedure may perform 616 power ramping for preamble transmission. At 622, if the maximum power ramping is reached, it may then be determined whether the most reliable RAR parameter is reached. If at 622 the maximum power is not reached, the procedure returns to transmit 608 the determined preamble in the determined PRACH resource using the determined UL beam. If the most reliable RAR parameter is reached, the RACH procedure fails 624. If the most reliable RAR parameter is not reached, the procedure selects 618 a PRACH resource and preamble for a RAR parameter with more reliability, e.g. more resources or lower code rate or repetitions then returns to step 608.

If the regular RAR cannot be detected with maximum power ramping, the UE can indicate to the gNB with a more reliable RAR configuration by transmitting a preamble from a configured set of PRACH resources and preambles. The gNB can then scale the RAR transmission for NTN UEs with severe DL coverage problems, as shown in FIG. 7.

Figure 7:
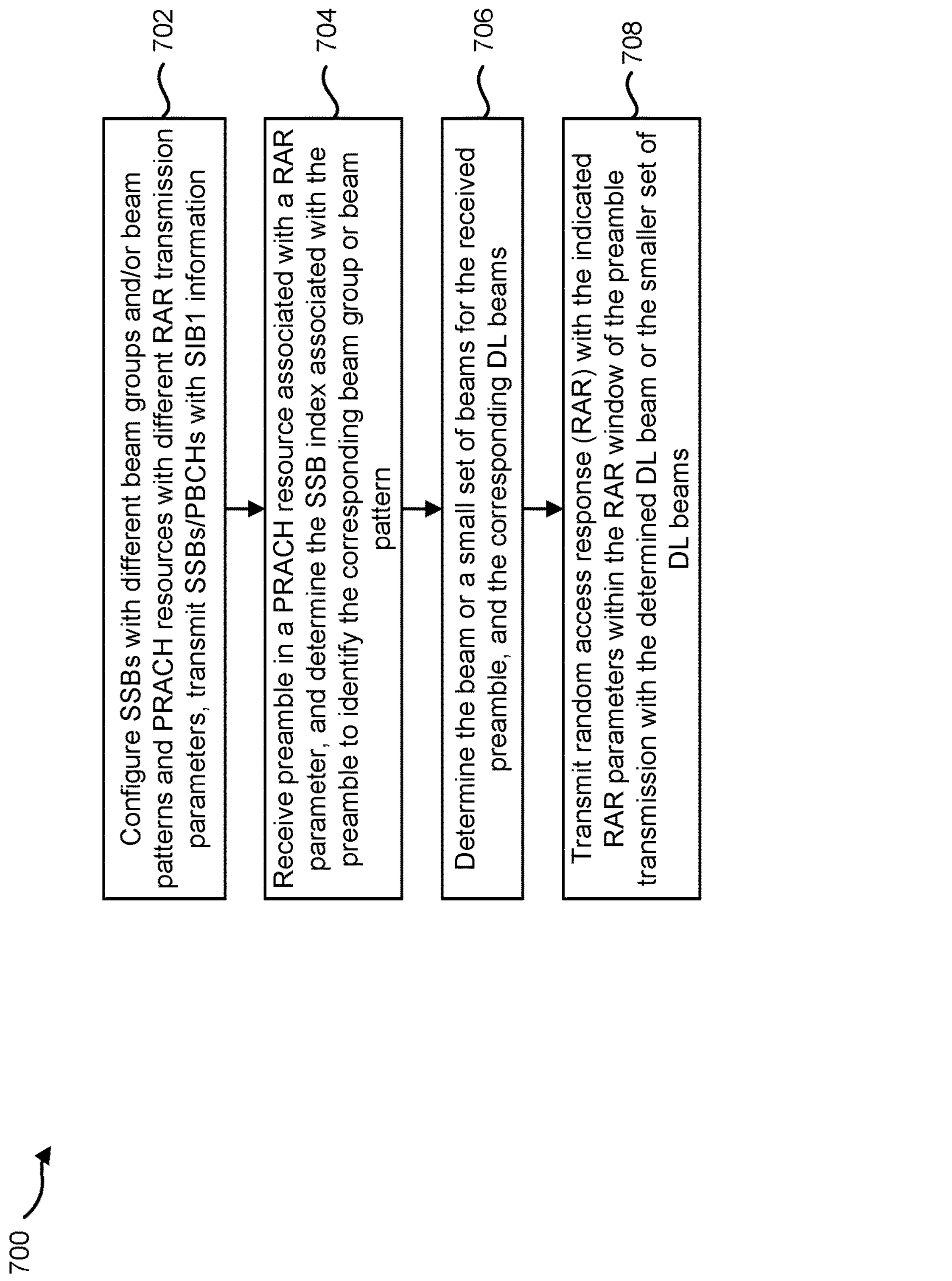
FIG. 7 is a flow diagram illustrating another example of gNB behavior.

FIG. 7 is a flow diagram illustrating another example of gNB behavior with RACH configuration and parameter indication. The gNB may configure 702 SSBs with different beam groups and/or beam patterns and PRACH resources with different RAR transmission parameters, transmit SSBs/PBCHs with SIB1 information. The gNB may receive 704 preamble in a PRACH resource associated with a RAR parameter, and determine the SSB index associated with the preamble to identify the corresponding beam group or beam pattern. The gNB may determine 706 the beam or a small set of beams for the received preamble, and the corresponding DL beams. The gNB may transmit 708 random access response (RAR) with the indicated RAR parameters within the RAR window of the preamble transmission with the determined DL beam or the smaller set of DL beams.

The gNB can configure beam groups and/or beam patterns for simultaneous beam transmissions. An SSB/PBCH transmission can be associated with a beam group and/or a beam pattern. The PRACH resources (time location/preamble sequence/cyclic shift, etc.) can be configured to map to the SSB indexes.

The UE can detect the SSB index and determine the UL beam and the PRACH resource for the PRACH preamble transmission.

Figure 8:
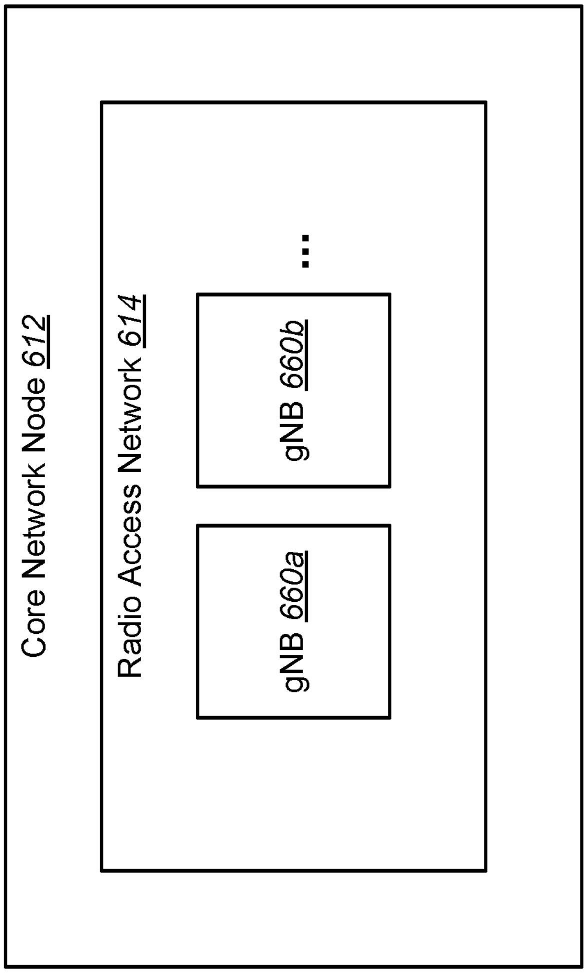
FIG. 8 is a block diagram illustrating one implementation of a core network node.

FIG. 8 is block diagram illustrating one implementation of a core network node 612. The core network node 612 may include a radio access network 614 that includes a plurality of gNBs (gNB 660*a*, 660*b*). Messages transmitted and received by the core network node 612 may be transmitted and received by the gNBs 660*a*, 660*b* in the radio access network 614. The core network node 612 may be part of the 5GC 118 or the NG-RAN 102.

Figure 9:
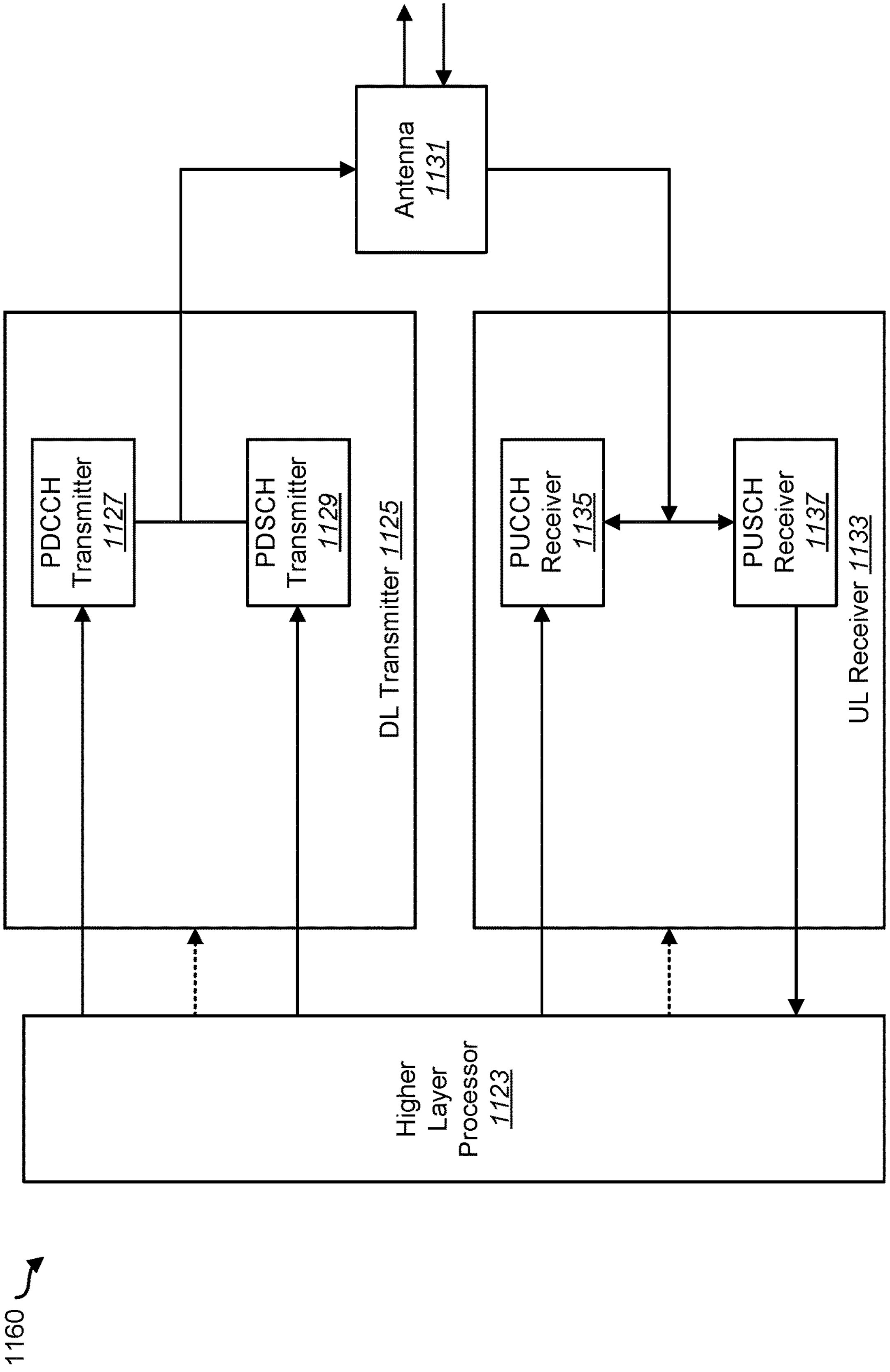
FIG. 9 is a block diagram illustrating one implementation of a gNB.

FIG. 9 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a wireless terminal's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 Uplink Control Information (UCI). The PUSCH receiver 1137 may provide the higher layer processor 1123 received transport blocks.

Figure 10:
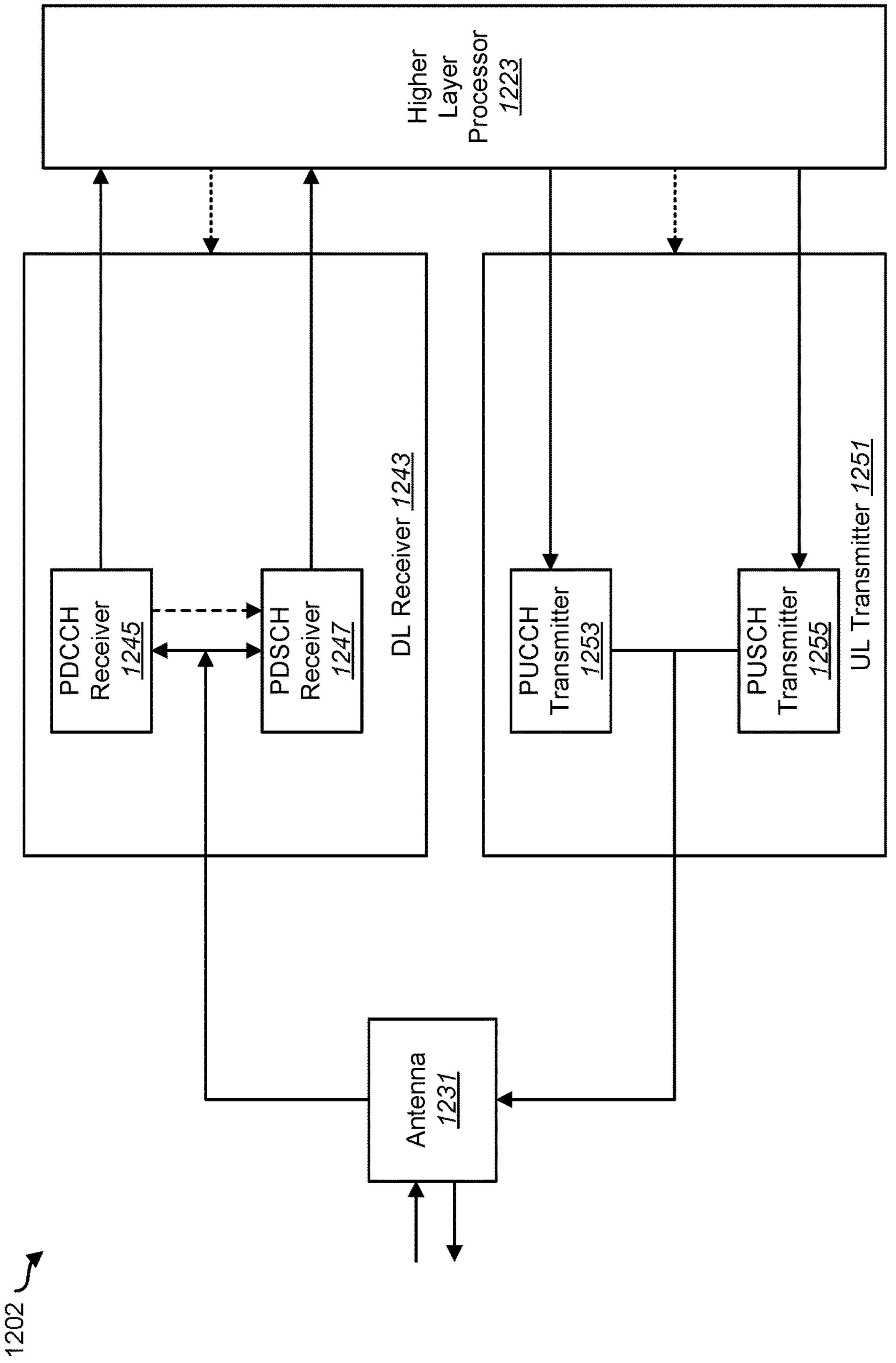
FIG. 10 is a block diagram illustrating one implementation of a wireless terminal.

FIG. 10 is a block diagram illustrating one implementation of a wireless terminal 1202. The wireless terminal 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a wireless terminal's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI (Downlink Control Information). The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G) PDCCH, GPDSCH, GPUCCH and GPUSCH" or the like can be used.

Figure 11:
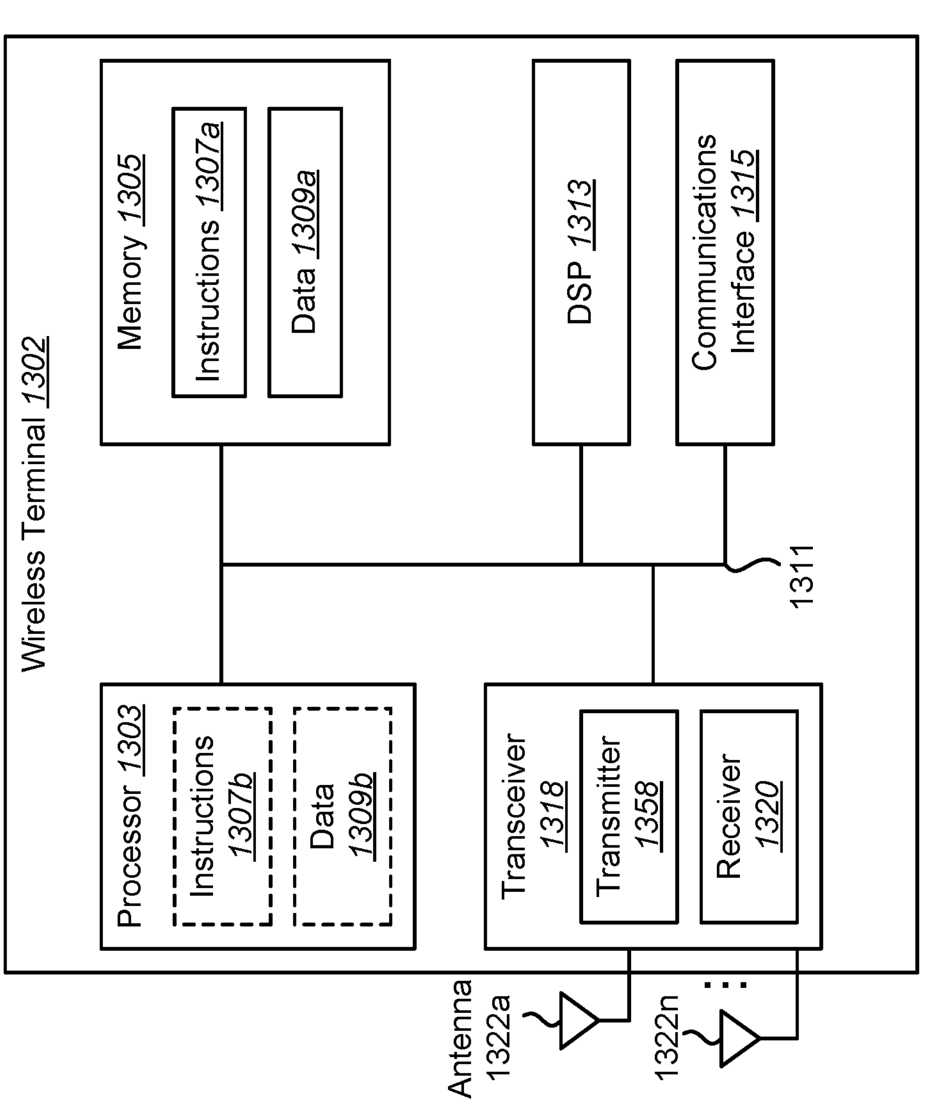
FIG. 11 illustrates various components that may be utilized in a wireless terminal.

FIG. 11 illustrates various components that may be utilized in a wireless terminal 1302. The wireless terminal 1302 described in connection with FIG. 11 may be implemented in accordance with the wireless terminal described herein. The wireless terminal 1302 includes a processor 1303 that controls operation of the wireless terminal 1302. The processor 1303 may also be referred to as a central processing unit (CPU). Memory 1305, which may include read-only memory (ROM), random access memory (RAM), a combination of the two or any type of device that may store information, provides instructions 1307*a* and data 1309*a* to the processor 1303. A portion of the memory 1305 may also include non-volatile random-access memory (NVRAM). Instructions 1307*b* and data 1309*b* may also reside in the processor 1303. Instructions 1307*b* and/or data 1309*b* loaded into the processor 1303 may also include instructions 1307*a* and/or data 1309*a* from memory 1305 that were loaded for execution or processing by the processor 1303. The instructions 1307*b* may be executed by the processor 1303 to implement the methods described above.

The wireless terminal 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322*a-n* are attached to the housing and electrically coupled to the transceiver 1318.

The various components of the wireless terminal 1302 are coupled together by a bus system 1311, which may include a power bus, a control signal bus and a status signal bus, in addition to a data bus. However, for the sake of clarity, the various buses are illustrated in FIG. 11 as the bus system 1311. The wireless terminal 1302 may also include a digital signal processor (DSP) 1313 for use in processing signals. The wireless terminal 1302 may also include a communications interface 1315 that provides user access to the functions of the wireless terminal 1302. The wireless terminal 1302 illustrated in FIG. 9 is a functional block diagram rather than a listing of specific components.

Figure 12:
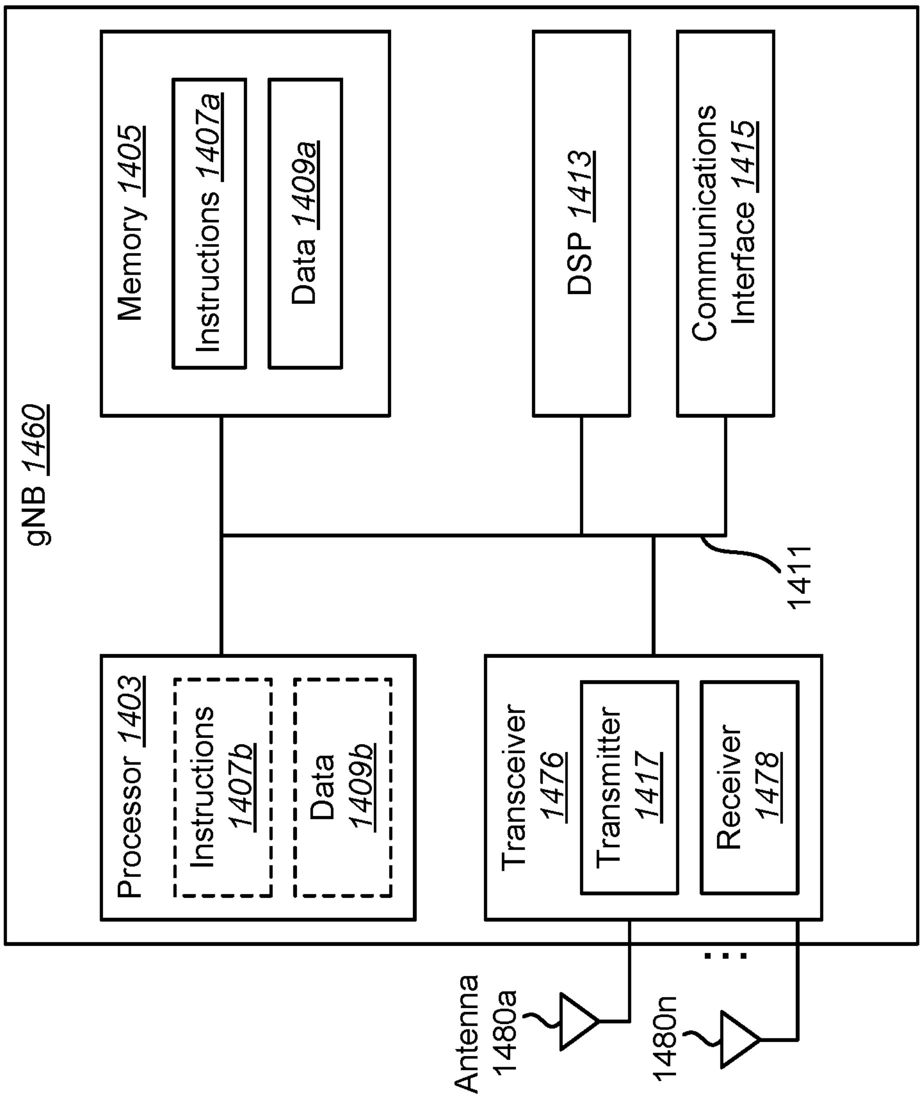
FIG. 12 illustrates various components that may be utilized in a gNB.

FIG. 12 illustrates various components that may be utilized in a gNB 1460. The gNB 1460 described in connection with FIG. 9 may be implemented in accordance with the gNB described herein. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407*a* and data 1409*a* to the processor 1403. A portion of the memory 1405 may also include non-volatile random-access memory (NVRAM). Instructions 1407*b* and data 1409*b* may also reside in the processor 1403. Instructions 1407*b* and/or data 1409*b* loaded into the processor 1403 may also include instructions 1407*a* and/or data 1409*a* from memory 1405 that were loaded for execution or processing by the processor 1403. The instructions 1407*b* may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480*a-n* are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 10 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 12 is a functional block diagram rather than a listing of specific components.

Figure 13:
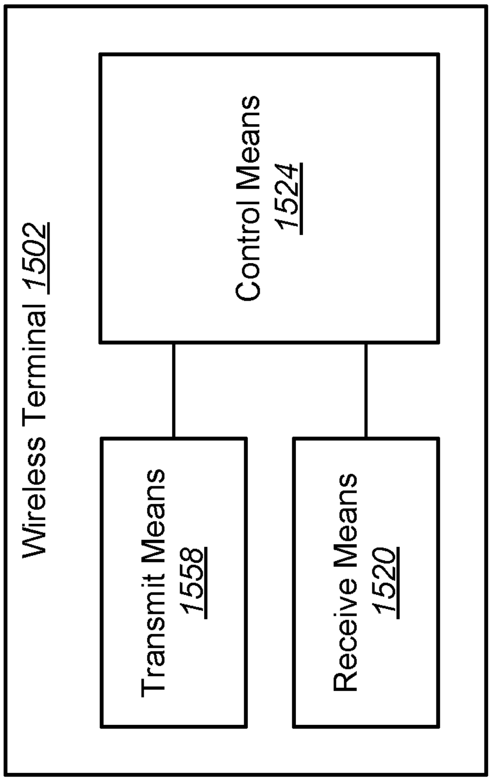
FIG. 13 is a block diagram illustrating one implementation of a wireless terminal in which the present systems and methods may be implemented.

FIG. 13 is a block diagram illustrating one implementation of a wireless terminal 1502 in which systems and methods for resource allocations of enhanced uplink transmissions may be implemented. The wireless terminal 1502 includes transmit means 1558, receive means 1520 and control means 1524. The transmit means 1558, receive means 1520 and control means 1524 may be configured to perform one or more of the functions described herein. FIG. 11 above illustrates one example of a concrete apparatus structure of FIG. 13. Other various structures may be implemented to realize one or more of the functions herein. For example, a DSP may be realized by software.

Figure 14:
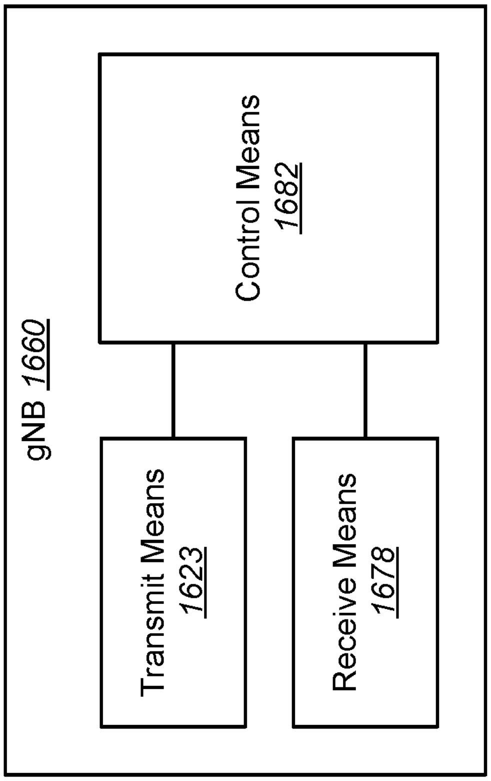
FIG. 14 is a block diagram illustrating one implementation of a gNB in which the present systems and methods may be implemented.

FIG. 14 is a block diagram illustrating one implementation of a gNB 1660 in which systems and methods for resource allocations of enhanced uplink transmissions may be implemented. The gNB 1660 includes transmit means 1623, receive means 1678 and control means 1682. The transmit means 1623, receive means 1678 and control means 1682 may be configured to perform one or more of the functions described herein. FIG. 12 above illustrates one example of a concrete apparatus structure of FIG. 14. Other various structures may be implemented to realize one or more of the functions described herein. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB or the wireless terminal according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or Hard Disk Drives (HDDs), and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB and the wireless terminal according to the systems and methods described above may be realized as an LSI that is a typical integrated circuit. Each functional block of the gNB and the wireless terminal may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:

receiving circuitry and transmitting circuitry, wherein the receiving circuitry is configured to:

monitor synchronization signal blocks (SSBs) and physical broadcast channels (PBCHs) to obtain system information block type 1 (SIB1) information including physical random access channel (PRACH) configurations with different PRACH resources and preamble formats mapped to different random access response (RAR) parameters having different redundancy levels;

determine a first preamble format, select a first preamble sequence, and a first PRACH resource based on a PRACH configuration mapped to a first RAR parameter having a default or low redundancy level for an initial preamble transmission;

the transmitting circuitry is configured to:

transmit a first preamble using the first preamble format, the first preamble sequence, and the first PRACH resource;

the receiving circuitry is further configured to:

monitor downlink (DL) signals for a random access response (RAR) within a RAR window corresponding to the first preamble;

in response to not receiving the RAR within the RAR window and a maximum preamble power ramping being reached, the receiving circuitry is further configured to:

determine a second preamble format, select a second preamble sequence, and a second PRACH resource based on a PRACH configuration mapped to a second RAR parameter having a higher redundancy level; and the transmitting circuitry is further configured to:

transmit a second preamble using the second preamble format, the second preamble sequence, and the second PRACH resource.

2. A base station (gNB), comprising:

transmitting circuitry and receiving circuitry, wherein the transmitting circuitry is configured to:

transmit synchronization signal blocks (SSBs) and physical broadcast channels (PBCHs) to provide system information block type 1 (SIB1) information including physical random access channel (PRACH) configurations with different PRACH resources and preamble formats mapped to different random access response (RAR) parameters having different redundancy levels;

receiving circuitry is configured to:

monitor for a first preamble transmitted using a first preamble format, a first preamble sequence, and a first PRACH resource based on a PRACH configuration mapped to a first RAR parameter having a default or low redundancy level for an initial preamble transmission;

the transmitting circuitry is further configured to:

transmit a random access response (RAR) within a RAR window corresponding to the first preamble in response to receiving the first preamble; and receiving circuitry is further configured to:

monitor for a second preamble transmitted using a second preamble format, a second preamble sequence, and a second PRACH resource based on a PRACH configuration mapped to a second RAR parameter having a higher redundancy level, wherein the second preamble is transmitted by a user equipment (UE) in response to the RAR not being received within the RAR window and a maximum preamble power ramping being reached.

3. A method by a user equipment (UE), comprising:

monitoring synchronization signal blocks (SSBs) and physical broadcast channels (PBCHs) to obtain system information block type 1 (SIB1) information including physical random access channel (PRACH) configurations with different PRACH resources and preamble formats mapped to different random access response (RAR) parameters having different redundancy levels;

determining a first preamble format, selecting a first preamble sequence, and a first PRACH resource based on a PRACH configuration mapped to a first RAR parameter having a default or low redundancy level for an initial preamble transmission;

transmitting a first preamble using the first preamble format, the first preamble sequence, and the first PRACH resource;

monitoring downlink (DL) signals for a random access response (RAR) within a RAR window corresponding to the first preamble;

in response to not receiving the RAR within the RAR window and a maximum preamble power ramping being reached, determining a second preamble format, selecting a second preamble sequence, and a second PRACH resource based on a PRACH configuration mapped to a second RAR parameter having a higher redundancy level; and transmitting a second preamble using the second preamble format, the second preamble sequence, and the second PRACH resource.

* * * * *